Figure 1:
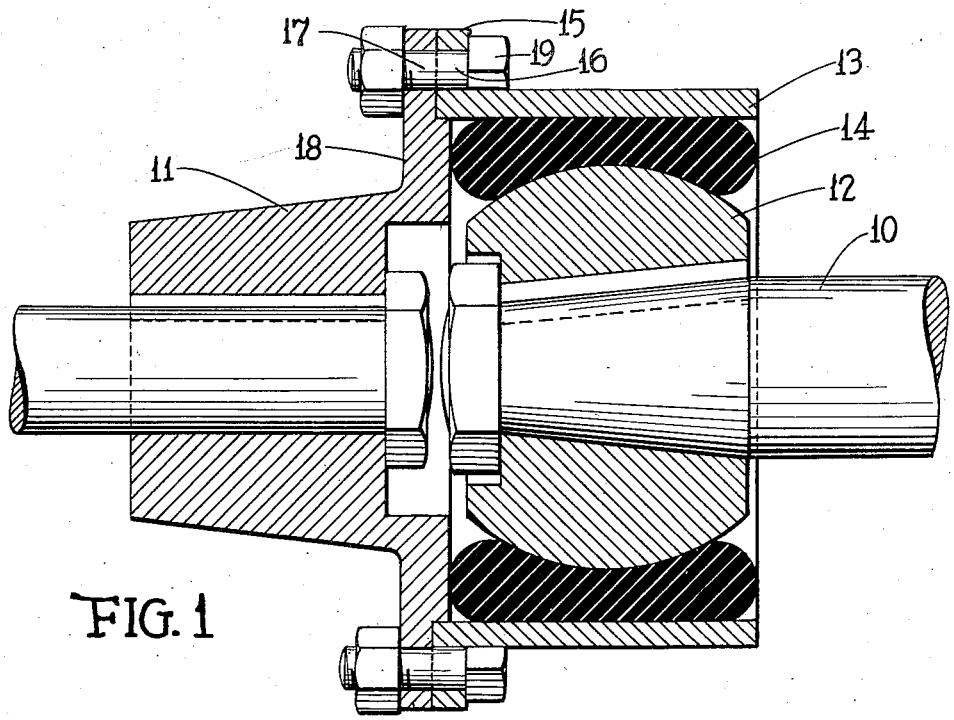

Dec. 26, 1933.  R. H. ROSENBERG  1,940,886

UNIVERSAL JOINT

Original Filed Feb. 12, 1930

INVENTOR.
RALPH H. ROSENBERG.
BY John P. Tarbox
ATTORNEY.

Patented Dec. 26, 1933

1,940,886

UNITED STATES PATENT OFFICE 1,940,886

UNIVERSAL JOINT

Ralph H. Rosenberg, Detroit, Mich., assignor to Budd Wheel Company, Philadelphia, Pa., a corporation of Pennsylvania Application February 12, 1930, Serial No. 427,728
Renewed May 24, 1933

6 Claims. (Cl. 64—96)

My invention relates to the art of universal joints and comprises an improvement over my prior application Serial No. 424,519, filed January 30, 1930. In that application I have illustrated a pair of substantially concentric inner and outer members of generally spherical shape at their telescoping portions with a live rubber sleeve interposed therebetween and bonded to the inner and outer elements of the joint by its inherent mass tension created by distorting it between these elements, or in any other suitable manner. In the joint of the type shown in that application, the interposed live rubber member has a very substantial mass tension throughout its length, and this mass tension is distributed substantially uniformly throughout the entire mass of the rubber body. In a joint of this type the turning of the shafts into an angularly disaligned relative position, of course, increases the mass tension of the rubber sleeve and thereby decreases to a certain amount, the flexibility of the joint. The object of my present invention is to obviate, insofar as possible, this undesirable increase in the mass tension of the rubber sleeve when the shafts are arranged at an angle. To this end I have provided a rubber sleeve interposed between the driving and driven members in such a way that the mass tension of its extremities is considerably less than that at a central portion. Thus the undesirable increase in the mass tension and consequent impairment of the flexibility of the joint under these circumstances is to a very considerable extent obviated.

Figure 2:
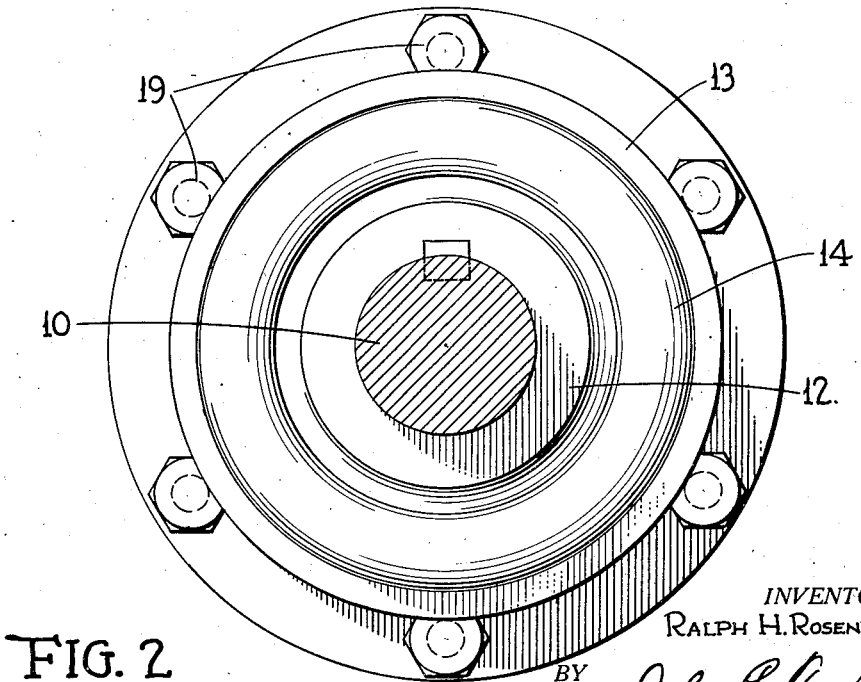

In the drawing,

Fig. 1 is an axial section through a part of the joint and associated members, and Fig. 2 is an end view of the joint.

Referring to the drawing by reference characters, the numerals 10 and 11 designate the driving and driven parts. Although either of these members may be the driving and the other the driven element, I will, for the purpose of convenience, describe the member 10 as the driving member and the member 11 as the driven member.

The driving shaft 10 is keyed to the driving member 12 of the joint which has a curved outer surface which is preferably substantially spherical. The member 13 is the driven element of the joint and is of substantially cylindrical cross section. While the periphery of this member is shown as extending substantially parallel to the longitudinal axes of the driving and driven members it may be curved, if desired. The important feature with respect to this member of the joint is that the radius of curvature of its longitudinal section is substantially greater than the radius of curvature of the periphery of the driving member 12. A deformable sleeve 14 which is preferably of live rubber is interposed between the driving and driven elements 12 and 13 of the joint. This sleeve is held in deformed condition between the members 12 and 13. By reason of the mass tension of the sleeve 14 which is produced by deforming it between the driving and driven members 12 and 13 of the joint, this sleeve gives a superior frictional driving bond between the driving and driven members.

The reason for the substantial difference in longitudinal radius of curvature between the driving and driven members will now be apparent. Due to this difference the distortable element 14 is tensioned to a maximum degree at a point in the neighborhood of its longitudinal center and the extremities of this member are under a relatively less mass tension.

With the relative dimensions shown, the resistance of the sleeve to angular displacement of the shafts is considerably diminished without a corresponding decrease in the maximum driving torque which they are capable of transmitting. This is due to the fact that upon angular displacement of the shafts there is an increase in the mass tension of certain parts of the distortable sleeve and a decrease in that of certain other parts.

The driven member 13 is provided with a flange 15 which has bolt holes 16 extending therethrough which align with bolt holes 17 in a flange 18 of a sleeve 11 which is keyed to the driven member of the shaft. The aligned bolt holes 16, 17 receive bolts 19 for securing the female member of the joint to the sleeve 11 which is keyed to the driven shaft.

While I have illustrated my invention as involving the coupling of driving and driven members having different centers of curvature longitudinally, it will be obvious to those skilled in the art that my invention may be practiced in other ways. For example, the curved surface member may be the outer, and the cylindrically surfaced member the inner. The invention may be applied in connection with concentric elements of this type by providing an interposed sleeve which is initially thinner at its longitudinal extremities than at its central portion, and thus obtain a similar distribution of mass tension which is obtained by the structure illustrated in the drawing. I therefore wish it to be understood that my invention is not limited to the relation of the male and female members of the joint shown in the drawing, but may be practiced in other ways, and that it includes within its scope any means whereby a rubber sleeve of the general type described in my aforesaid application is given a greater normal mass tension toward its longitudinal center than in the neighborhood of its longitudinal extremities. Practice of the invention as illustrated by utilizing juxtaposed surfaces of driving and driven members of non-concentric character, will result in numerous modifications.

It will be noted that I have obviated the use of centering devices such as necessary in connection with my aforesaid application by reason of the symmetrical distribution of the mass tension of the distortable part of my joint, whereby the portion of maximum mass tension is located at the center of the joint.

It will be readily obvious to those skilled in the art that I have produced a universal joint which combines the advantages of a universal joint and a flexible shaft coupling, and that my universal joint is simple, inexpensive and extremely flexible.

I wish my disclosure to be interpreted in an illustrative rather than a limiting sense.

What I claim is:

1. A torque transmitting shaft coupling comprising an inner member convex in longitudinal section, a substantially cylindrical outer member having its axis substantially coincident with the axis of said inner member, and its inner periphery spaced therefrom and an annular deformable element interposed between said inner and outer members under substantial deformation to effect a driving connection.

2. A torque transmitting universal joint comprising an inner member convex in longitudinal section, a substantially cylindrical outer member having its axis substantially coincident with the axis of said inner member and its inner periphery spaced therefrom, and a deformable elastic sleeve under substantial deformation interposed between said members, the portion of the inner member of maximum diameter being normally arranged in a substantially central position with respect to the length of said deformable sleeve.

3. A torque transmitting shaft coupling comprising an inner convex member, an outer member, and an interposed annular deformable element held between said members under mass tension, the distance between said members being less, and the mass tension of said interposed deformable element being greater, in the region of its longitudinal center than at other portions thereof.

4. A torque transmitting universal joint comprising an outer substantially cylindrical member, an inner substantially spherical member of a diameter approximately as great as the length of said cylindrical member, and an interposed sleeve of elastic material held under mass tension between said members.

5. An oscillating joint comprising in combination an inner member made up of a substantially spherical portion and a shank adapted to be secured to one of the members to be joined, an outer substantially cylindrical member adapted to be secured to the other member to be joined, and a rubber bushing held in deformed condition between said inner and outer members and gripping the spherical portion of said inner member and the cylindrical surface of said outer member, whereby relative movement between the contacting surfaces of said bushing and said members is prevented, said bushing being spaced from the shank of said inner member to permit angular movement of the latter.

6. An oscillating joint comprising in combination an inner member made up of a substantially spherical portion and a shank adapted to be secured to one of the members to be joined, an outer member adapted to be secured to the other member to be joined, and a rubber bushing held in deformed condition between said inner and outer members and gripping the spherical surface of said inner member and the surface of said outer member, whereby relative movement between the contacting surfaces of said bushing and said members is prevented, said bushing being thinner at its central portion than at its ends and spaced from the shank portion of said inner member to permit relative movement of the latter.

RALPH. H. ROSENBERG.